US010624000B2

(12) United States Patent
Jenkins et al.

(10) Patent No.: US 10,624,000 B2
(45) Date of Patent: Apr. 14, 2020

(54) DIGITAL WIRELESS INTERCOM WITH USER-SELECTABLE AUDIO CODECS

(71) Applicant: Robert Bosch GmbH, Stuttgart (DE)

(72) Inventors: Keith Jenkins, Lincoln, NE (US); La Rhue Gene Friesen, Lincoln, NE (US); Jim Andersen, Lincoln, NE (US); Jason Brchan, Omaha, NE (US); Bob Basine, Waverly, NE (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/328,571

(22) PCT Filed: Mar. 14, 2017

(86) PCT No.: PCT/EP2017/055921
§ 371 (c)(1),
(2) Date: Feb. 26, 2019

(87) PCT Pub. No.: WO2017/157896
PCT Pub. Date: Sep. 21, 2017

(65) Prior Publication Data
US 2019/0230559 A1 Jul. 25, 2019

Related U.S. Application Data

(60) Provisional application No. 62/307,962, filed on Mar. 14, 2016.

(51) Int. Cl.
*H04B 7/00* (2006.01)
*H04W 28/24* (2009.01)
(Continued)

(52) U.S. Cl.
CPC .......... *H04W 28/24* (2013.01); *G10L 19/18* (2013.01); *H04L 67/12* (2013.01); *H04L 67/16* (2013.01);
(Continued)

(58) Field of Classification Search
CPC ...... H04W 28/24; H04W 8/245; G01L 19/18; H04L 67/12; H04L 67/16; H04L 67/34; H04M 11/025
See application file for complete search history.

(56) References Cited

U.S. PATENT DOCUMENTS

2006/0034260 A1* 2/2006 Svedberg ................ H04W 4/10
370/352
2007/0254591 A1* 11/2007 Nassimi .................... H04L 1/04
455/63.3
(Continued)

FOREIGN PATENT DOCUMENTS

CA          2326754 A1   6/2001
WO       2009078524      6/2009

OTHER PUBLICATIONS

Examination Report No. 1 from the Intellectual Property Office of Australia for Application No. 2017235275 dated Jul. 4, 2019 (8 pages).
(Continued)

*Primary Examiner* — Md K Talukder
(74) *Attorney, Agent, or Firm* — Michael Best & Friedrich LLP

(57) ABSTRACT

Systems and methods are provided for operating an intercom system using a wireless access point. A codec is selected (501) from a plurality of available codecs. In some implementations, the available codecs present a tradeoff between audio quality and intercom device capacity. The access point operates (505) using the selected codec and, in response to detecting a new intercom device connecting to the intercom system (507) through the access point, the access point transmits a signal to the new intercom device identifying the selected codec. In response to a determination that the new intercom device does not have the selected codec stored in its memory, the access point automatically uploads (515) the (Continued)

codec to the new intercom device and transmits communications with the intercom device—including, for example, audio stream data—using the selected codec.

12 Claims, 5 Drawing Sheets

(51) Int. Cl.
*H04M 11/02* (2006.01)
*H04L 29/08* (2006.01)
*G10L 19/18* (2013.01)
*H04W 8/24* (2009.01)
*H04W 48/14* (2009.01)
*H04W 48/16* (2009.01)
*H04W 84/12* (2009.01)
*H04M 7/00* (2006.01)
*H04W 84/10* (2009.01)

(52) U.S. Cl.
CPC ........... *H04L 67/34* (2013.01); *H04M 11/025* (2013.01); *H04W 8/245* (2013.01); *H04W 48/14* (2013.01); *H04M 7/0072* (2013.01); *H04W 48/16* (2013.01); *H04W 84/105* (2013.01); *H04W 84/12* (2013.01)

(56) References Cited

U.S. PATENT DOCUMENTS

| | | | | |
|---|---|---|---|---|
| 2010/0158260 | A1* | 6/2010 | Huddart | H04R 5/04 381/56 |
| 2010/0273417 | A1* | 10/2010 | Tian | H04M 1/6066 455/41.2 |
| 2010/0299724 | A1 | 11/2010 | Masiyowski et al. | |
| 2011/0211524 | A1* | 9/2011 | Holmes | H04N 7/18 370/328 |
| 2013/0157674 | A1 | 6/2013 | Jylha-Ollila et al. | |
| 2013/0260737 | A1* | 10/2013 | Sampat | G06F 9/44526 455/418 |
| 2014/0362764 | A1* | 12/2014 | Aksu | H04L 65/1069 370/328 |
| 2015/0092774 | A1* | 4/2015 | Fartmann | H04L 47/15 370/389 |
| 2015/0200993 | A1 | 7/2015 | Assem et al. | |
| 2017/0279950 | A1* | 9/2017 | Auranen | H04M 1/6041 |
| 2018/0013880 | A1* | 1/2018 | Rao | H04L 63/306 |
| 2019/0052743 | A1* | 2/2019 | Puttick | H04M 9/001 |
| 2019/0222989 | A1* | 7/2019 | Cannata | H04L 67/34 |
| 2019/0230559 | A1* | 7/2019 | Jenkins | G10L 19/18 |

OTHER PUBLICATIONS

International Search Report and Written Opinion for Application No. PCT/EP2017/055921 dated May 15, 2017 (12 pages).

Aeq: "CrossNET Compact IP intercom system," Sep. 22, 2015, Retrieved from Internet on May 4, 2017 <URL: http://acceso.siweb.es/content/774577/Catalogos_EN/Crossnet_eng_web.pdf>.

F 01u Rts: "ROAMEO Family Wireless System TR-1800 AP-1800," Apr. 13, 2017, pp. 1-158, Retrieved from the Internet on May 4, 2017 <URL: https://fccid.io/pdf.php?id=3361721>.

* cited by examiner

DIGITAL WIRELESS INTERCOM WITH USER-SELECTABLE AUDIO CODECS

RELATED APPLICATIONS

This application claims the benefit of U.S. Provisional Patent Application No. 62/307,962, filed Mar. 14, 2016.

BACKGROUND

The present invention relates to an intercom system for audio communication. Some digital wireless intercom systems utilize a fixed preprogrammed audio codec (coder/decoder) that defines how digital audio signals are encoded prior to transmitting and decoded after being received by another device.

SUMMARY

Among other things, a codec establishes the audio quality of a transmitted message and the bandwidth utilization for communicating. The bandwidth utilization ultimately determines the maximum number of audio channels that can be used within a wireless intercom system. Using a fixed audio codec means that a user of a wireless intercom has no option to trade audio quality for bandwidth (i.e., the maximum number of audio channels available in the system.

In some embodiments, the invention provides an intercom system with a user-selectable audio codec that enables a user to selectively improve audio quality by decreasing the maximum number of available channels and, conversely, increase the maximum number of available channels by decreasing audio quality. The system includes a user interface provided, for example, on either the access point or a computer connected to the access point. The user interface can be used to configure operation of the intercom system. Through this user interface, a user can select an audio codec from a list of available codecs. In doing so, the user can increase or decrease the audio quality while correspondingly increasing or decreasing the maximum number of available audio channels. When a wireless intercom device (e.g., a "beltpack") connects to the access point, its software is configured to determine the audio codec currently being used by the access point and to then set its own audio codec to match.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
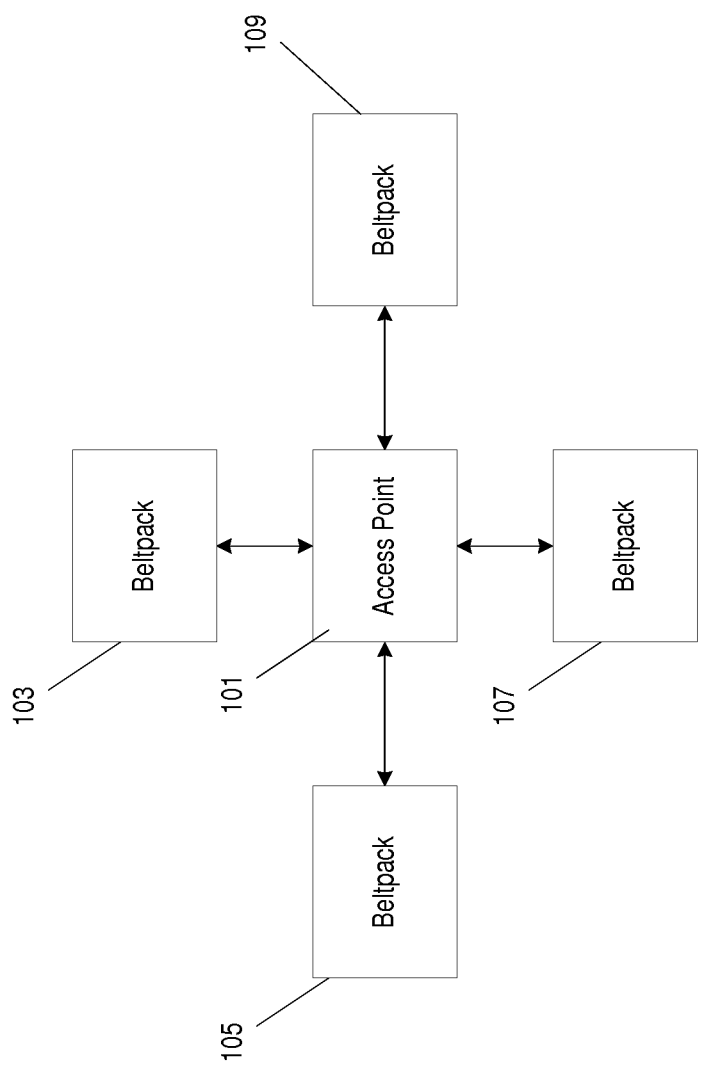
FIG. 1 is a block diagram of an intercom system including an access point and multiple connected beltpack devices according to one embodiment.

FIG. 1 illustrates one example of a wireless intercom system. The system includes an access point 101 and multiple "beltpack" devices 103, 105, 107, 109. Each beltpack device is carried or worn by a different user and used to verbally communicate with one or more other users. Although the example of FIG. 1 shows only a single access point 101, in some implementations, the intercom system can include multiple interconnected access points.

Figure 2:
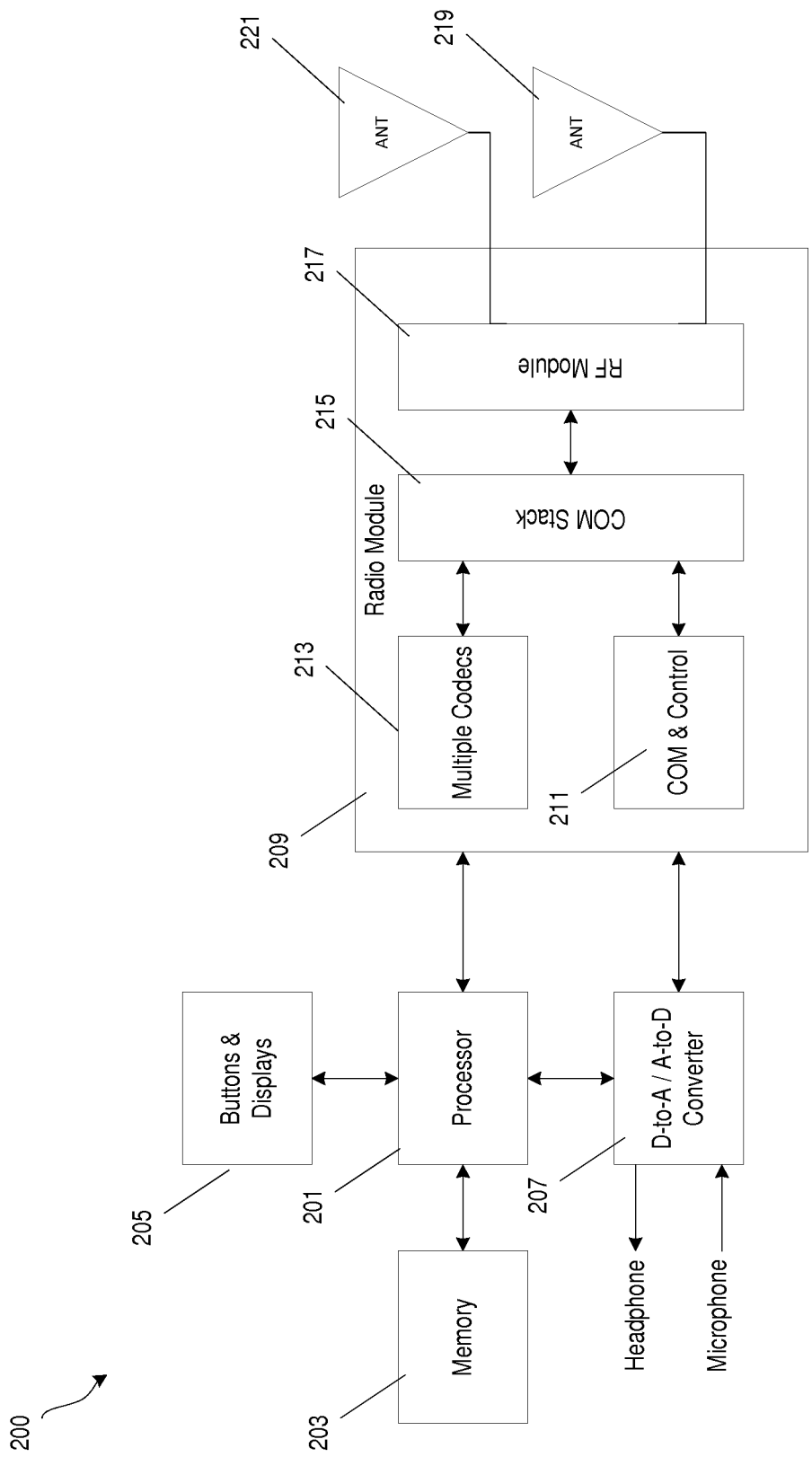
FIG. 2 is a block diagram of a beltpack device connectable to the intercom system of FIG. 1.

FIG. 2 further illustrates the details of one example of a beltpack device 200 connectable to the intercom system through the access point. The beltpack device 200 includes a processor 201 communicatively coupled to a memory 203. The memory 203 stores instructions that, when executed by the processor 201, control the functionality and operation of the beltpack device 200. The beltpack 200 also includes a user interface including one or more buttons and displays 205. The processor 201 is connected to an analog-to-digital/digital-to-analog converter 207. The converter 207 is connected to a microphone for receiving audio and a headphone for outputting audio.

The beltpack 200 also includes a radio module 209. The radio module includes a COM & Control module 211, multiple stored codecs 213, a COM stack, 215, and an RF module 217 communicative coupled to one or more antennas 219, 221.

When the beltpack 200 captures incoming audio through the microphone, the analog audio is converted to digital using one of the stored codecs 213. The codec defines the format and structure of the digital audio stream created by the beltpack device. The digital audio stream is then transmitted through the antenna to an access point and is further transmitted from the access point to one or more other devices connected to the intercom system. Similarly, when a digital audio stream is received by the beltpack 200, the codec is used to "decode" the digital data so that it can be output as analog audio through the headphone.

Figure 3:
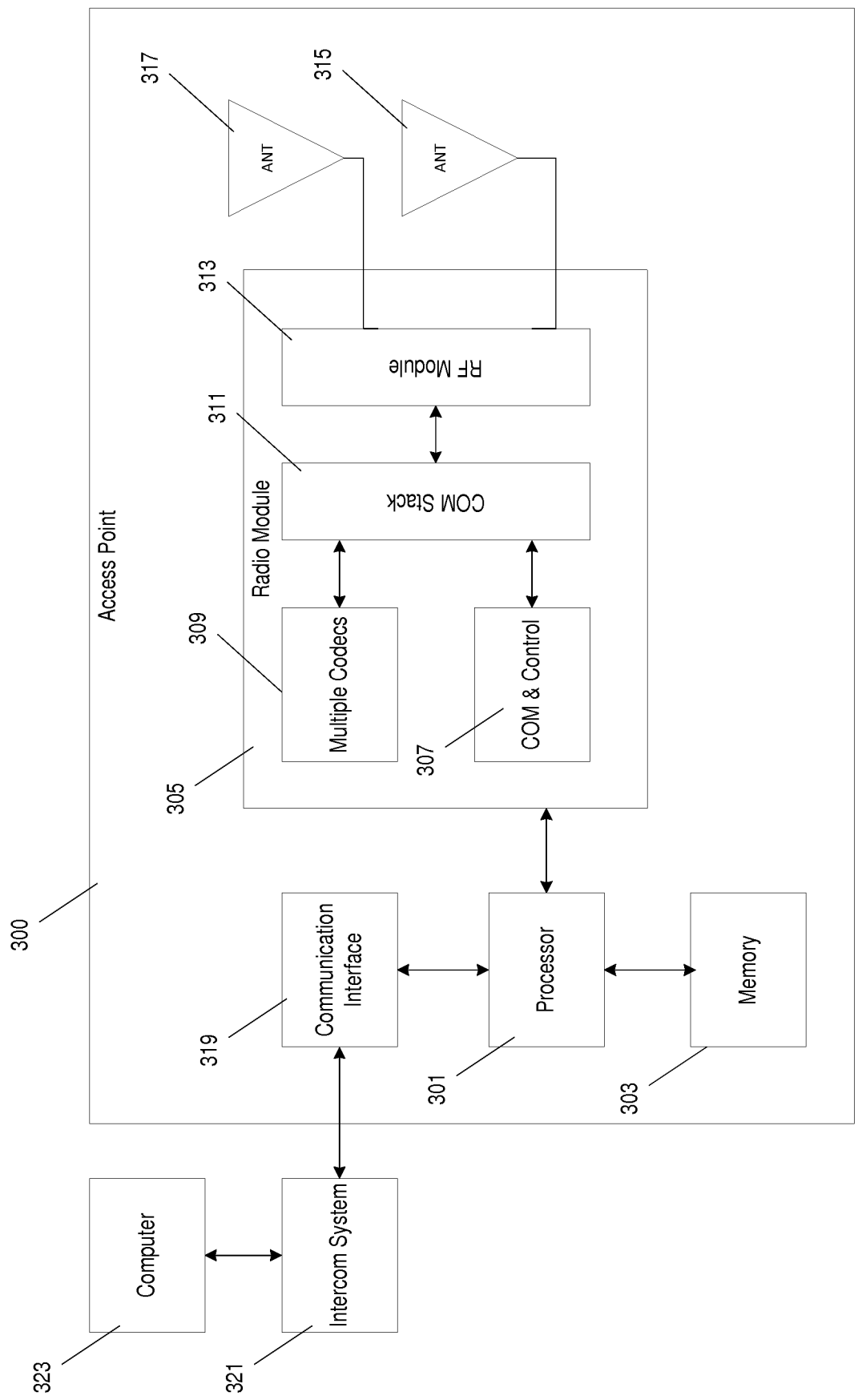
FIG. 3 is a block diagram of the access point and a connected computer in the system of FIG. 1.

FIG. 3 is an example of an access point 300 such as the one illustrated in FIG. 1. Like the beltpack, the access point also includes a processor 301, a non-transitory computer-readable memory 303, and a radio module 305. Again, the radio module 305 includes a COM & Control module 307, multiple stored codecs 309, a COM stack 311, and an RF module 313 communicatively coupled to one or more antennas 315, 317 for wireless communication. The access point 300 also includes a communication interface 319 such as, for example an Ethernet or WiFi communication interface, for communicating with other access points and a computer 323 through the intercom system 321.

Figure 4:
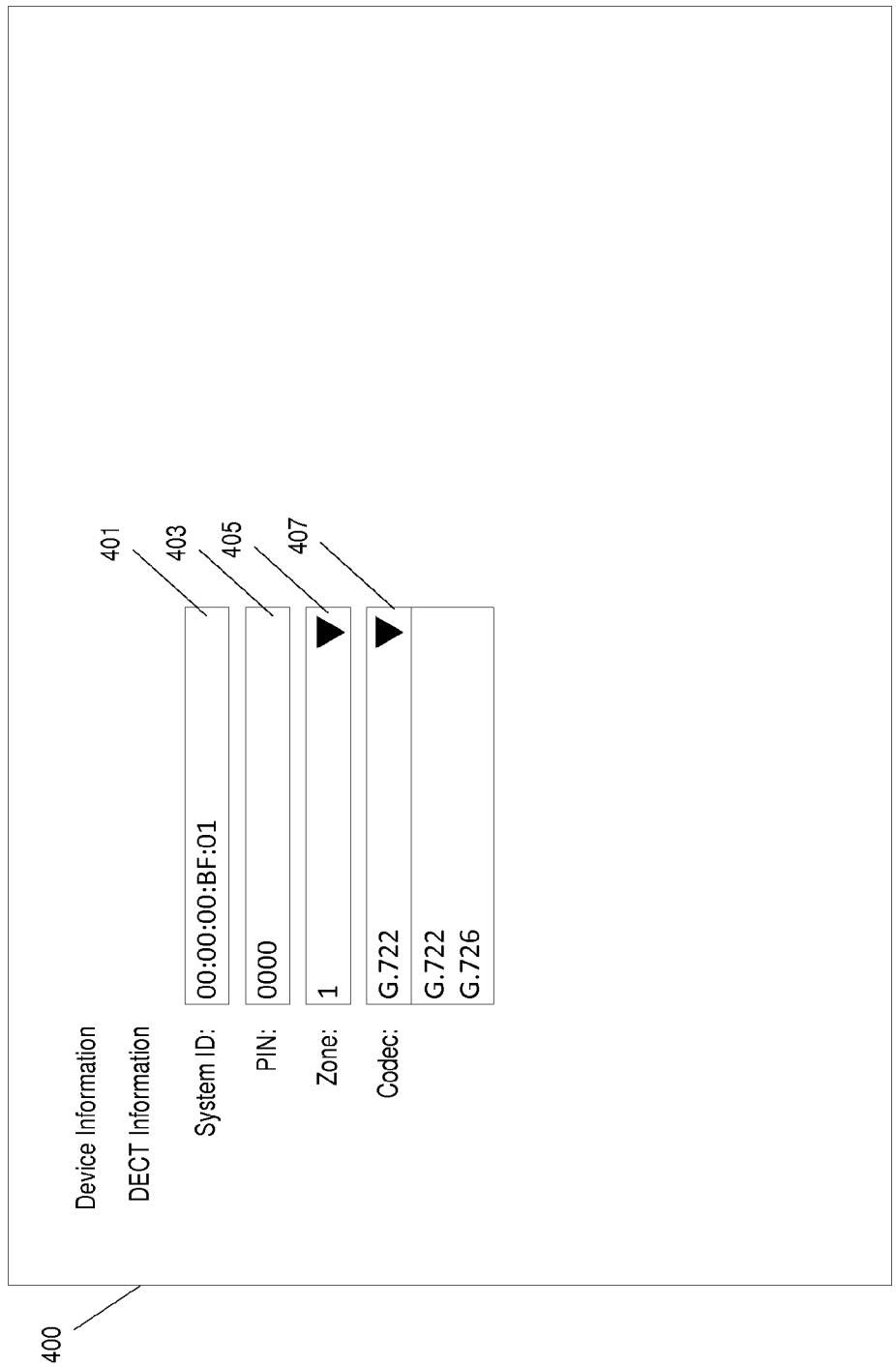
FIG. 4 is a screen-shot of a user interface used to select an audio codec from a plurality of available codecs in the system of FIG. 1.

In this example, the computer 323 includes a software implemented user interface that can be used to configure the settings for the access points connected to the intercom system 321. The computer 323 can include a variety of platforms and implementations including, for example, a desktop computer, a laptop, a tablet computer, or a smart phone. FIG. 4 illustrates one example of a screen 400 included in the user interface. The screen shows the system ID 401 and PIN 403. It also includes a first drop down menu 405 for selecting a "zone" and a second drop down menu 407 for selecting an audio codec from a list of available audio codecs.

Figure 5:
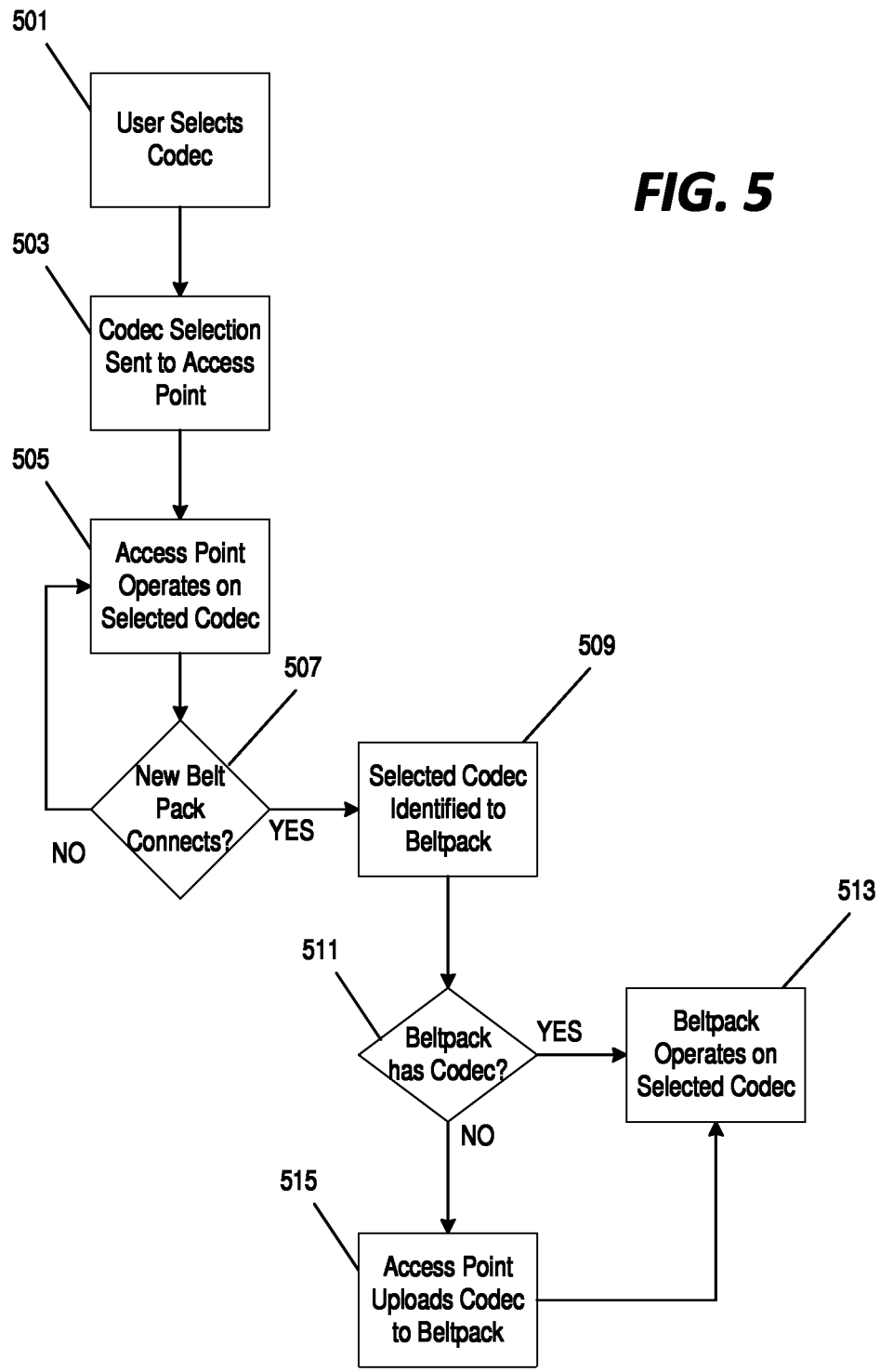
FIG. 5 is a flowchart of a method for selecting an audio codec and for establishing usage of the selected audio codec as new beltpack devices connect to an access point in the system of FIG. 1.

As illustrated in FIG. 5, a user selects an audio codec from the list using the drop down menu (step 501). The codec selection is then sent to the access point (step 503) and the access point operates using the selected audio codec (step 505). When a new beltpack connects to the access point (step 507), the access point identifies the selected audio codec to the connecting beltpack (step 509). If the selected codec is already stored on the beltpack (step 511), the beltpack begins to operate through the access point using the selected codec (step 513). If the beltpack does not yet have the selected codec stored to its memory, in some implementations, the access point will upload the codec to the beltpack (step 515) so that the beltpack can communicate through the access point (step 513).

By selecting a specific codec from the drop-down menu, the user is selecting audio and operational characteristics for the intercom system. Some codecs provide greater audio quality, but require greater bandwidth utilization. As such, selecting a codec that provides greater audio quality means that fewer channels will be available on the wireless intercom system and fewer beltpacks will be able to connect. Conversely, the maximum number of beltpacks that can connect to the intercom system can be increased by selecting an audio codec with decreased audio quality. In the user interface example of FIG. 4, a user is assumed to be familiar with the various codecs listed in the drop-down menu and, as such, the user is able to select a codec that improves audio quality and/or adjusts the maximum number of users accordingly. However, in other examples, the user interface screen may be further configured to display an indication of relative audio quality and a number of maximum users/channels associated with a given codec. In this way, even a more novice user is able to selectively establish a maximum number of users by adjusting audio quality (and vice versa).

Thus, the invention provides, among other things, a system and method for selectively controlling the trade-off between audio quality and bandwidth utilization by providing a mechanism for user-selectable audio codecs to be implemented in a wireless intercom system. Various features and advantages of the inventions are set forth in the following claims.

What is claimed is:

1. A wireless access point for an intercom system, the access point comprising:
a wireless transceiver; and
an electronic controller configured to
receive a selection of a codec,
operate the wireless transceiver using the selected codec,
detect a new intercom device connecting to the intercom system through the wireless transceiver,
transmit a signal to the new intercom device through the wireless transceiver, the signal identifying the selected codec,
automatically upload the selected codec to the new intercom device in response to a determination that the new intercom device does not have the selected codec stored in a memory of the new intercom device, and
transmit communications with the new intercom device using the selected codec.

2. The access point of claim 1, wherein the electronic controller is further configured to determine that the new intercom device does not have the selected codec by receiving a second signal from the new intercom device through the wireless transceiver indicating that the new intercom device does not have the selected codec.

3. The access point of claim 1, wherein the electronic controller is configured to transmit communications with the new intercom device using the selected codec by
receiving audio stream data from the new intercom device, wherein the audio stream data is encoded using the selected codec, and
transmitting the audio stream data, encoded using the selected codec, to one or more additional intercom devices connected to the intercom system.

4. The access point of claim 1, wherein the electronic controller is further configured to display a list of available codecs on a graphical user interface, and wherein the electronic controller is configured to receive the selection of the codec by receiving, through the graphical user interface, the selection of the codec from the displayed list of available codecs.

5. The access point of claim 1, wherein the electronic controller is configured to receive the selection of the codec by
receiving an indication of a desired device capacity for the intercom system,
automatically identifying a codec from a list of available codecs that will provide a highest audio quality while facilitating a device capacity for the intercom system that meets or exceeds the desired device capacity, wherein the device capacity for the intercom system is determined based on available bandwidth for the access point and bandwidth requirements of the codec, and
selecting the automatically identified codec.

6. The access point of claim 1, wherein the electronic controller is configured to receive the selection of the codec by
receiving an indication of a desired level of audio quality,
automatically identifying a codec from a list of available codecs that will allow the highest device capacity for the intercom system while providing a level of audio quality that meets or exceeds the indicated desired level of audio quality, wherein the device capacity for the intercom system is determined based on available bandwidth for the access point and bandwidth requirements of the codec, and
selecting the automatically identified codec.

7. A method of operating an intercom system including a wireless access point, the method comprising:
receiving, by an electronic controller of the wireless access point, a selection of a codec,
operating, by the electronic controller, a wireless transceiver of the wireless access point using the selected codec,
detecting, by the electronic controller, a new intercom device connecting to the intercom system through the wireless transceiver,
transmitting, by the wireless transceiver of the wireless access point, a signal to the new intercom device, the signal identifying the selected codec,
automatically uploading the selected codec from the wireless access point to the new intercom device in response to a determination that the new intercom device does not have the selected codec stored in a memory of the new intercom device, and
transmitting communications with the new intercom device using the selected codec.

8. The method of claim 7, further comprising determining that the new intercom device does not have the selected codec by receiving, by the wireless access point, a second signal from the new intercom device through the wireless transceiver indicating that the new intercom device does not have the selected codec.

9. The method of claim 7, wherein transmitting communications with the new intercom device using the selected codec includes
receiving audio stream data from the new intercom device, wherein the audio stream data is encoded using the selected codec, and
transmitting the audio stream data, encoded using the selected codec, to one or more additional intercom devices connected to the intercom system.

10. The method of claim 7, further comprising displaying a list of available codecs on a graphical user interface, and wherein receiving the selection of the codec includes receiving, through the graphical user interface, the selection of the codec from the displayed list of available codecs.

11. The method of claim 7, wherein receiving the selection of the codec includes
receiving an indication of a desired device capacity for the intercom system,
automatically identifying a codec from a list of available codecs that will provide a highest audio quality while facilitating a device capacity for the intercom system that meets or exceeds the desired device capacity, wherein the device capacity for the intercom system is determined based on available bandwidth for the access point and bandwidth requirements of the codec, and
selecting the automatically identified codec.

12. The method of claim 7, wherein receiving the selection of the codec includes
receiving an indication of a desired level of audio quality,
automatically identifying a codec from a list of available codecs that will allow the highest device capacity for the intercom system while providing a level of audio quality that meets or exceeds the indicated desired level of audio quality, wherein the device capacity for the intercom system is determined based on available bandwidth for the access point and bandwidth requirements of the codec, and
selecting the automatically identified codec.

\* \* \* \* \*